(12) United States Patent
Sugimoto

(10) Patent No.: US 7,997,619 B2
(45) Date of Patent: Aug. 16, 2011

(54) TRACK FRAME FOR WORK MACHINE

(75) Inventor: Takatoshi Sugimoto, Toyonaka (JP)

(73) Assignee: Kubota Corporation, Osaka (JP)

( * ) Notice: Subject to any disclaimer, the term of this patent is extended or adjusted under 35 U.S.C. 154(b) by 132 days.

(21) Appl. No.: 12/377,905

(22) PCT Filed: Sep. 19, 2007

(86) PCT No.: PCT/JP2007/068140
§ 371 (c)(1),
(2), (4) Date: Jun. 11, 2009

(87) PCT Pub. No.: WO2008/038549
PCT Pub. Date: Apr. 3, 2008

(65) Prior Publication Data
US 2010/0244422 A1    Sep. 30, 2010

(30) Foreign Application Priority Data

Sep. 28, 2006  (JP) ................. 2006-265164
Sep. 28, 2006  (JP) ................. 2006-265165

(51) Int. Cl.
*B62D 21/06* (2006.01)
(52) U.S. Cl. ............... 280/793; 280/124.109; 280/781; 280/792; 280/785
(58) Field of Classification Search ............... 280/792, 280/793, 780, 781, 785, 797, 800, 798; 296/204; 180/89.12, 89, 13; 37/397
See application file for complete search history.

(56) References Cited

U.S. PATENT DOCUMENTS

| 1,629,890 | A  | * | 5/1927  | Ronk ............................ 280/781 |
| 3,861,498 | A  | * | 1/1975  | Grove ........................... 182/141 |
| 4,231,699 | A  | * | 11/1980 | Thompson ..................... 414/687 |
| 5,293,949 | A  | * | 3/1994  | Zimmermann ............... 180/9.48 |
| 6,322,104 | B1 | * | 11/2001 | Duppong et al. .............. 280/781 |
| 7,204,518 | B2 | * | 4/2007  | Kubo et al. .................... 280/781 |
| 7,204,519 | B2 | * | 4/2007  | Kubo et al. .................... 280/781 |
| 7,293,374 | B2 | * | 11/2007 | Fukushima ..................... 37/397 |
| 7,293,375 | B2 | * | 11/2007 | Fukushima et al. ............. 37/397 |
| 7,338,081 | B2 | * | 3/2008  | Urase et al. ................... 280/781 |
| 7,458,633 | B2 | * | 12/2008 | Takeuchi et al. .............. 296/204 |

(Continued)

FOREIGN PATENT DOCUMENTS

EP    1 479 831 A2    11/2004

(Continued)

*Primary Examiner* — Paul N Dickson
*Assistant Examiner* — Nicole Verley
(74) *Attorney, Agent, or Firm* — The Webb Law Firm

(57) ABSTRACT

A track frame in which stress concentration caused by a work load is avoided and that has increased strength. These are achieved by reducing the weigh of connection legs and providing sufficient welding length for joint surfaces for joining the connection legs. The track frame has a front and rear pair of left/right connection legs (61, 71) joined to a center frame (30) and side frames (7) to connect the center and side frames (30, 7). Each of the connection legs (61, 71) has a body part (62, 72) formed in a tubular shape, a center joint part (63, 73) formed at one opening edge of the body part (62, 72) and joined to the center frame (30), and a side joint part (64, 74) formed at the other opening edge of the body part (62, 72) and joined to a side frame (7). The center joining parts (63, 73) are flush with or projected from the upper surface of the center frame (30).

13 Claims, 13 Drawing Sheets

U.S. PATENT DOCUMENTS

| | | | |
|---|---|---|---|
| 7,614,465 B2* | 11/2009 | Brindle | 180/9.1 |
| 7,681,918 B2* | 3/2010 | Lacher et al. | 280/781 |
| 7,730,647 B2* | 6/2010 | Kubo et al. | 37/397 |
| 2004/0177533 A1* | 9/2004 | Fukushima et al. | 37/347 |
| 2004/0232687 A1 | 11/2004 | Kubo et al. | |
| 2004/0244230 A1* | 12/2004 | Kubo et al. | 37/347 |
| 2005/0172527 A1* | 8/2005 | Mimuro et al. | 37/466 |

FOREIGN PATENT DOCUMENTS

| | | |
|---|---|---|
| EP | 1 479 833 A2 | 11/2004 |
| JP | 2004-268762 A | 9/2004 |
| JP | 2005001651 A | 1/2005 |
| JP | 2005001652 A | 1/2005 |
| JP | 2005001653 A | 1/2005 |

* cited by examiner

TRACK FRAME FOR WORK MACHINE

TECHNICAL FIELD

The present invention relates to a track frame for a work machine such as a swiveling work machine.

BACKGROUND ART

A swivel work machine such as a backhoe employs, as a traveling device, a crawler traveling device having crawlers comprised of rotatable endless belts on the right and left. And, this crawler traveling device includes a track frame as a device body. The track frame usually includes a center frame having a swivel bearing which rotatably supports a swivel frame mounting thereon an engine, an engine hood, etc. and a pair of right and left side frames connected to the right end left ends of the center frame and extending in the fore/aft direction. Each side frame includes, at its front and rear ends, an idler and a drive wheel about which a crawler is wound.

As this type of track frame, there is known one wherein the center frame is formed by welding and joining upper and lower plate members formed of metal plates to each other through a plurality of wall plate members. Further, on the lateral side of this center frame, these plate members form a plurality of leg portions and the side frame is joined to the leading ends of these leg portions.

If the center frame is constructed of metal plates as described above, it is needed to assemble and weld the plate members having complicated shape and/or bend with each other under mutual linear contact condition thereof. As a result, there tends to occur stress concentration or irregularity in the welding quality. On the other hand, if the thickness of each plate member is increased to ensure the strength, this can invite disadvantageous weight increase.

As a swivel work machine having a track frame capable of avoiding the above problem, Patent Document 1, for instance, discloses a swivel work machine in which the track frame is formed by joining the center frame and the side frame through connecting legs provided in pairs on the front and rear sides and on the right and left sides (4 legs in total).

Patent Document 1: Japanese Patent Application "Kokai" No. 2005-1652

DISCLOSURE OF THE INVENTION

However, as the connecting legs described above are made of cast steel, there would arise the problem of greater weight than the conventional leg portions formed of metal plates.

In view of the above, the present invention is intended to provide a track frame which can realize weight reduction in the connecting legs and ensure sufficient welding lengths for joining faces for joining these connecting legs, thereby to avoid stress concentration due to work load and to achieve strength enhancement.

For accomplishing the above-noted object, the present invention has provided the following technical solutions.

Namely, according to the technical solution provided by the present invention for solving the above problem, a track frame comprises a center frame mounting a swiveling body so that the swiveling body can swivel about a swivel axis, a pair of right and left side frames arranged laterally of the center frame, and a pair of front and rear, right and left connecting legs jointed to said center frame and said side frames for connecting these together; wherein each said connecting leg includes a tubular body portion having a pair of opened edges, a center joining portion provided at one of the opened edges of the body portion to be joined to the center frame and a side joining portion provided at the other opened edge of the body portion to be joined to the side frame, said center joining portion being flush with or projecting upwardly from a top face of said center frame.

By forming the connecting leg tubular like the above-described construction, weight reduction is made possible, as compared with a solid construction.

Further, since the center joining portion of the connecting leg is formed flush with or projects upwardly of the top face of the center frame. This allows the mutual joining faces of this center joining portion and the center frame to extend vertically, whereby a sufficient vertical welding length can be assured between these joining faces.

As a result, it becomes possible to realize weight reduction in the connecting lets and to ensure sufficient welding lengths for joining faces for joining these connecting legs, thereby to avoid stress concentration due to work load and to achieve strength enhancement.

Further, preferably, said body portion is formed of an arcuate curved face and has a cross section normal to a longitudinal direction thereof increasing from a longitudinal center thereof toward said pair of opened edges; and said center joining portion has a vertical dimension greater than a vertical dimension of the center frame.

With the above, the body portion of the connecting leg is constricted at the center portion thereof between the opposed opened edges. As a result, compared with a body portion extending straight between the opposed opened edges without such constriction at the center portion, the cross section can be decreased, thus achieving weight reduction. On the other hand, it may be thought that such reduction in the cross section at the center portion can invite corresponding reduction in the strength of the connecting leg. However, since the center joining portion or the side joining portion provided at the opened edge of the body portion is connected to the center frame or the side frame through the welding portion having the sufficient length, thereby enhancing the support strength at these joining portions, the support strength of the connecting leg as a whole can be maintained or improved.

Further, as the body portion of the connecting leg is configured such that its center portion is constricted to interconnect the opposed opened edges smoothly, it is possible to avoid stress concentration at this intermediate portion, thus allowing smooth stress transmission between the center frame and the side frame through the connecting legs.

Further, preferably, said side joining portion has a fore/aft dimension along the side frame greater than a vertical dimension thereof.

With the above construction, as the side joining portion of the connecting leg is formed with the increased length along the side frame, this results in extension in the fore/aft direction of the joining faces of this side joining portion and the side frame, thus ensuring sufficient welding length in the fore/aft direction between these joining faces.

Further, preferably, the body portion of the connecting leg has a flat upper face, with front/rear edges thereof being chamfered.

The above construction allows efficient stress transmission at the upper portion of the connecting leg between the center frame and the side face, thereby to avoid local stress concentration at the two joining portions and/or the upper portion of the connecting leg.

Further, preferably, in the center joining portion of the connecting leg, one of its upper and lower ends is formed as an overlapping portion to be overlapped vertically with the center frame and the other is formed as an abutment portion in horizontal abutment to the center frame, and said overlapping portion and said abutment portion are joined to the center frame by welding.

With the above-described construction, there is ensured sufficient welding length between the center frame and the center joining portion of the connecting leg, so that the joining strength of the connecting leg to the center frame can be improved. Further, as the connecting leg is joined to the center frame through the two joining faces extending normal to each other. As a result, it becomes possible for this joining portion to effectively transmit and distribute any such loads as a tensile load, a compression load, and shearing load applied to the joining portions of the center frame and the connecting leg due to a work load.

Further, preferably, the side joining portion of the connecting leg is configured such that at an upper end of a contacting portion in contact with a lateral wall of the side frame, a superposing piece to be superposed on the upper wall of the side frame, and the contacting portion and the superposing portion are joined to the side frame.

With the above-described construction, there is ensured sufficient welding length in the joining portions of the center frame and the side joining portion of the connecting leg, so that the joining strength of the connecting leg relative to the center frame can be improved. Further, as the connecting leg is jointed to the center frame through the two joining faces extending normal to each other relative to the side frame. As a result, it becomes possible for this joining portion to effectively transmit and distribute any such loads as a tensile load, a compression load, and shearing load applied to the joining portions of the center frame and the connecting leg which may be applied to the joining portions of the center frame and the connecting leg from a work load.

Further, preferably, said center frame includes an upper plate member, a lower plate member and a dozer bracket supporting a dozer device, and said connecting legs are joined to said upper and lower plate members and said dozer bracket.

With the above construction, the dozer bracket is jointed to the connecting legs and also connected to the upper and lower plate members constituting the center frame. That is, the connecting legs are joined directly to the center frame and connected to the center frame also through the dozer bracket. With this, the work load from the dozer device can be transmitted effectively via the dozer bracket to the connecting legs and the center frame. Further, it becomes possible also to cause the dozer bracket to bear the load transmitted to these connecting legs and the center frame.

Further, if the dozer bracket is inserted at the joining portion between the connecting legs and the center frame, it is possible to ensure sufficient rigidity in these joining portions. Moreover, the load applied to the connecting legs and the center frame is transmitted also to the dozer bracket, whereby the strength of the track frame is enhanced.

As a result of the above, the load from the dozer device can be transmitted effectively to the connecting legs and the center frame and it becomes also possible to cause a component supporting this dozer device to bear the load transmitted to these connecting legs and the center frame.

Further, preferably, said dozer bracket includes a plate-like support wall joined to said upper plate member and said lower plate member and extending in the right/left direction; said support wall includes, at lateral edges thereof, a pair of right and left dozer supports for supporting a pair of right and left dozer arms constituting said dozer device, each said dozer support having an inner bracket portion projecting from the support wall and a plate-like outer bracket portion opposed to said inner bracket portion and extending through the lateral end of the support wall from the front side to the rear side of the support wall; and said outer bracket portion has its upper end lower ends jointed respectively to said upper and lower plate members and has its inner face joined to said support wall and also has its outer face joined to said connecting leg.

With the above construction, as the connecting leg is joined to the outer face of the outer bracket portion. As a result, it is possible to ensure sufficient joining area. Further, this construction results in increase in the support strength of the connecting let.

Moreover, the outer bracket portion is joined to the support wall and the connecting leg, with the outer bracket portion being bound between these support wall and connecting leg. The support strength of the outer bracket portion is increased and the stress transmission among these outer bracket portion, the connecting leg and the support wall can take place smoothly, so that it is possible to avoid local stress concentration at the joining portions of these outer bracket portion, connecting leg and support wall.

Further, preferably, said upper plate member defines a cutout portion which slightly exposes the upper end face of the outer bracket portion to the outside as seen in a plan view; and said connecting leg includes an engaging portion which covers the exposed upper end face of the outer bracket portion and comes into contact with said cutout portion of the upper plate member.

With the above construction, when the engaging portion of the connecting leg comes into contact with the upper end face of the outer bracket portion, the connecting leg comes into engagement with the outer bracket portion. This provides further improvement in the support strength of the connecting leg. And, as this contact is a face contact, the support strength between these connecting leg and outer bracket portion is further improved.

Further, preferably, said connecting leg is joined to said center frame and said outer bracket portion, with a lower end of the connecting leg being vertically overlapped with the center frame.

The above construction ensures joining area of the connecting leg relative to the center frame, so that the joining strength between the connecting leg and the center frame can be further enhanced.

Further, preferably, a right/left center portion of said upper plate member extends further forwardly of the support wall of the dozer bracket; said dozer bracket includes, between a pair of right and left dozer supports, a cylinder support for supporting a dozer cylinder constituting said dozer device; an upper end of said cylinder support includes a cylinder pivot which projects further forwardly than said upper plate member by an amount corresponding to a plate thickness of this upper plate member, and is joined to said upper plate member from a rear end thereof joined to said support wall to a rear portion of said cylinder support.

With the above construction, as the rear portion of the cylinder pivot of the cylinder support comes into contact with the front end portion of the upper plate member, the cylinder support comes into engagement with the upper plate member, thereby further enhancing the support strength of the cylinder support. Further, as the cylinder pivot projects by the amount corresponding to the plate thickness of the upper plate member, it becomes possible to cause the entire cylinder support to be positioned upwardly by this amount corresponding to the plate thickness. With this, it is possible to ensure sufficient height for the space under the cylinder support.

BEST MODE OF EMBODYING THE INVENTION

Next, an embodiment of the present invention will be described with reference to the drawings.

Figure 13:
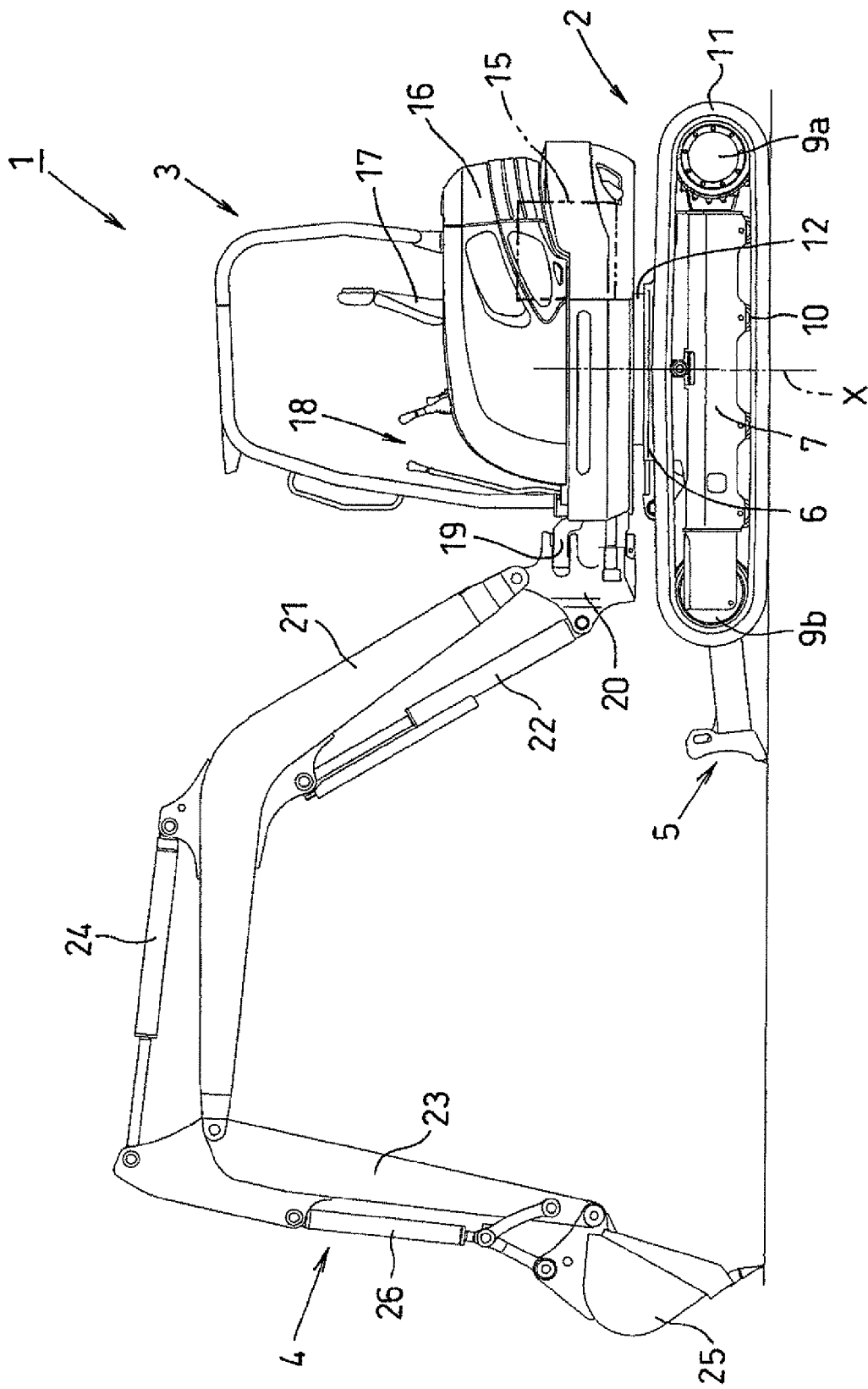
FIG. 13 is a left side view of a backhoe.

FIG. 13 shows a rear compact swiveling type backhoe including a traveling device 2 having a track frame 6 relating to the present invention. This backhoe 1 is comprised of the traveling device 2, a swiveling body 3, an excavating device 4 and a dozer device 5.

The traveling device 2 is constructed as a crawler traveling device wherein a pair of right and left side frames 7 constituting the track frame 6 as the device body, rotatably mounts drive wheels 9a, driven wheels 9b, and a plurality of track rollers 10, and around and between the drive wheel 9a and the driven wheel 9b, there is entrained a crawler traveling body 11 made of rubber or iron, and the drive wheels 9a are driven by a traveling drive source such as a hydraulic motor.

On the top of the track frame 6, there is mounted the swiveling body 3 via a swivel baring 12 so that this swiveling body 3 can swivel about a swivel axis X. Further, to the front portion of the track frame 6, the dozer device 5 is attached to be liftable up/down relative thereto.

The swiveling body 3 mounts an engine 15, an engine hood 16, a driver's seat 17, a steering device 18, etc. Further, to the front portion of the swiveling body 3, there is attached the excavating device 4 so that this device 4 is pivotable about a vertical axis.

Referring to the excavating device 4, base ends respectively of a boom 21 and a boom cylinder 22 are pivoted to a pivot bracket 20 supported to a bracket 19 through a vertical shaft, and an arm 23 is pivoted to the leading end of the boom 21 to be pivotable by means of an arm cylinder 24, and a bucket 25 is pivoted to the leading end of the arm 23 to be capable of scooping/dumping actions by mans of a bucket cylinder 26.

Figure 12:
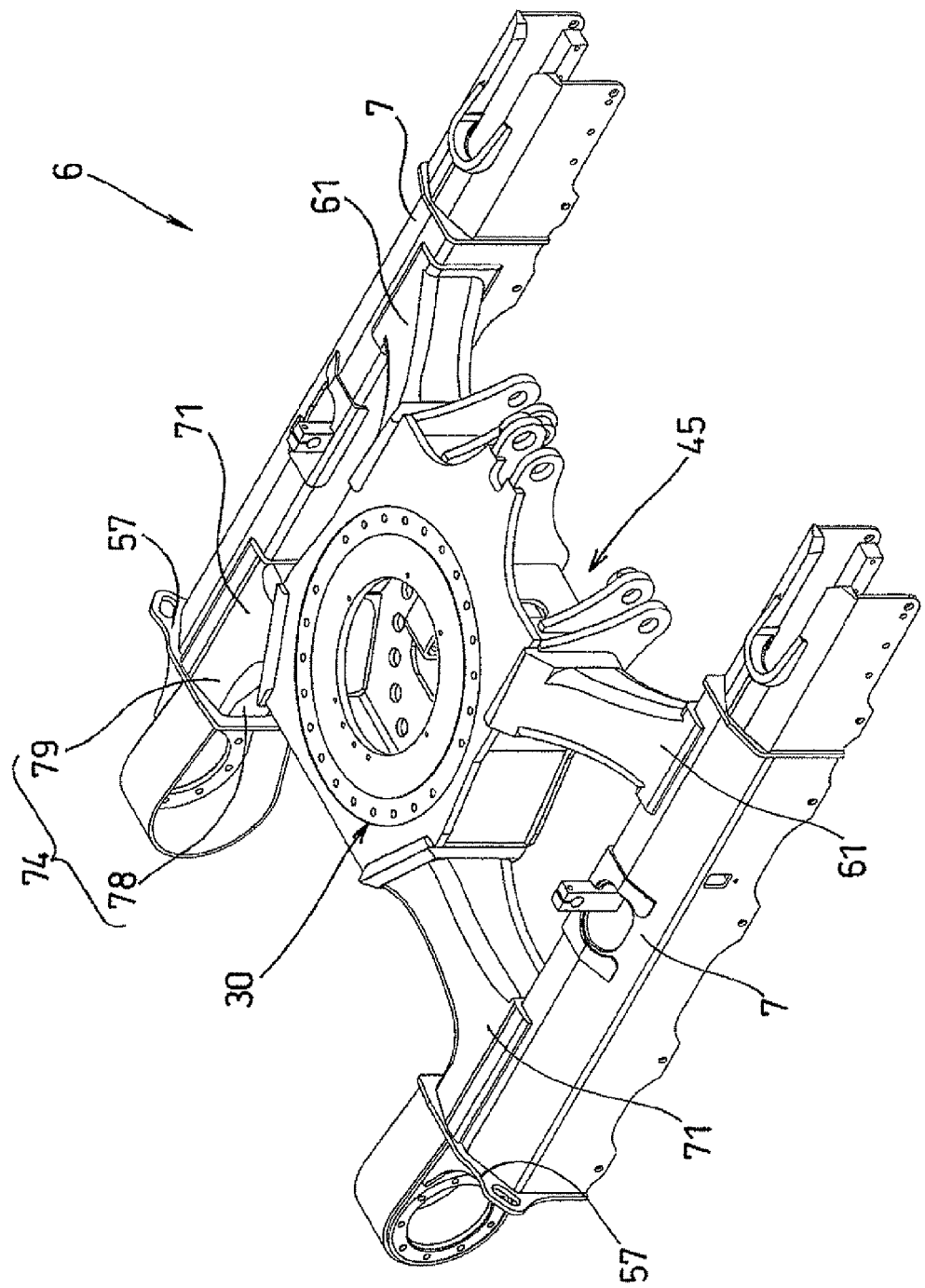
FIG. 12 is a perspective view of the track frame.

The track frame 6, as shown in FIG. 14 and FIG. 12, includes a center frame 30, a pair of side frames 7 disposed on the right and left sides of the center frame 30, and pairs of front/rear, right/left connecting legs 61, 71.

Figure 1:
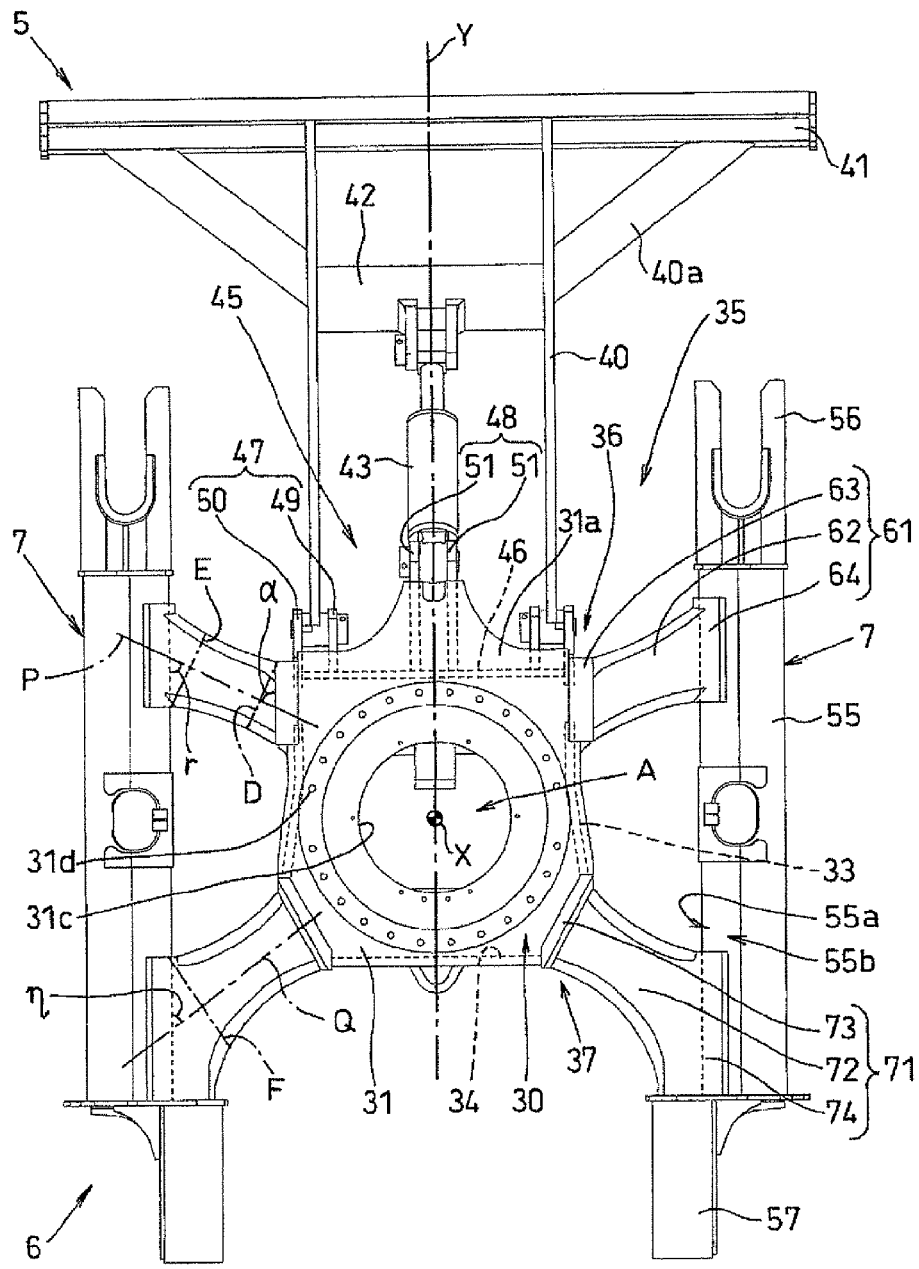
FIG. 1 is a plan view showing a track frame relating to the present invention.
Figure 3:
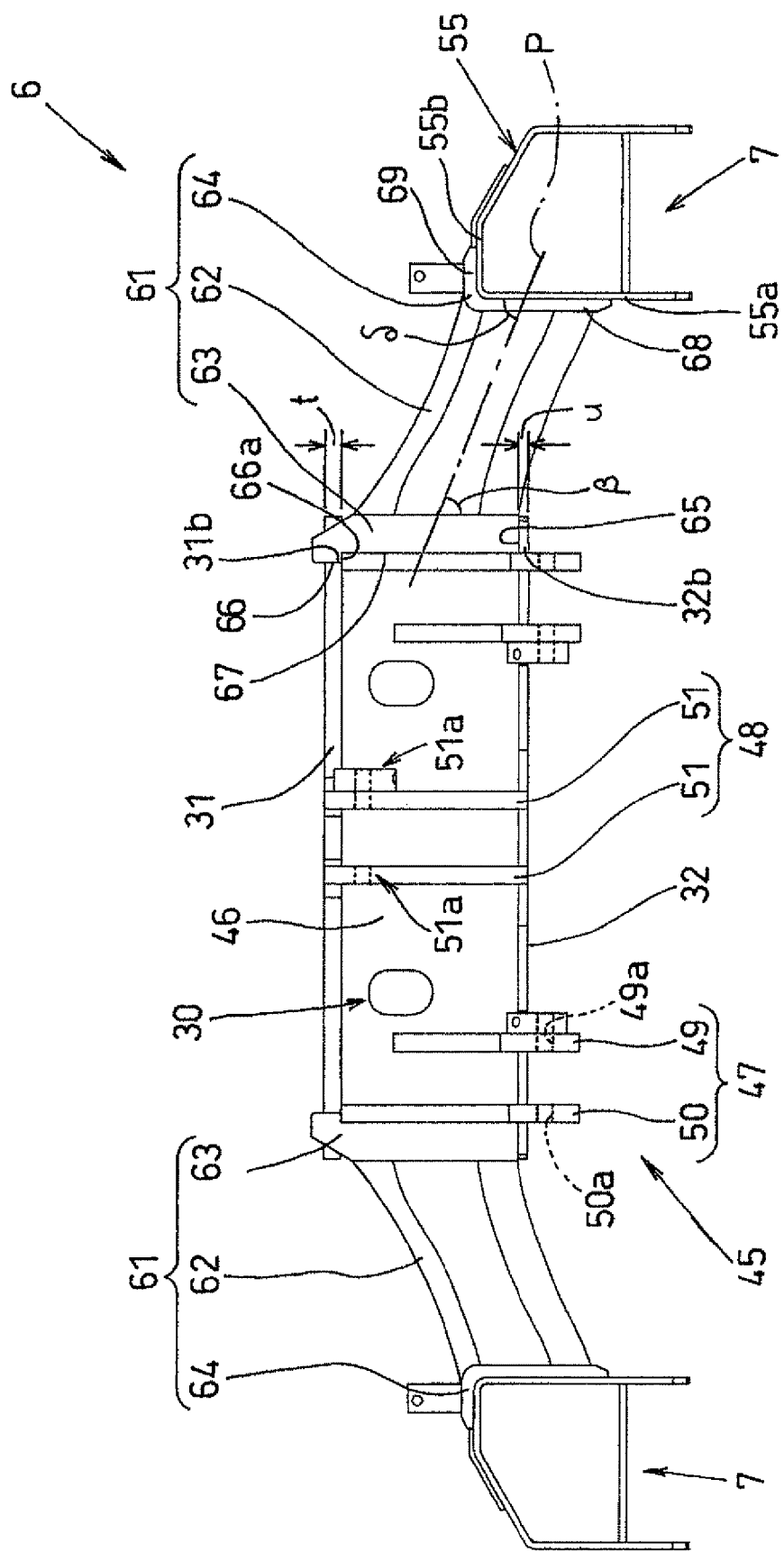
FIG. 3 is a front view of the track frame.
Figure 7:
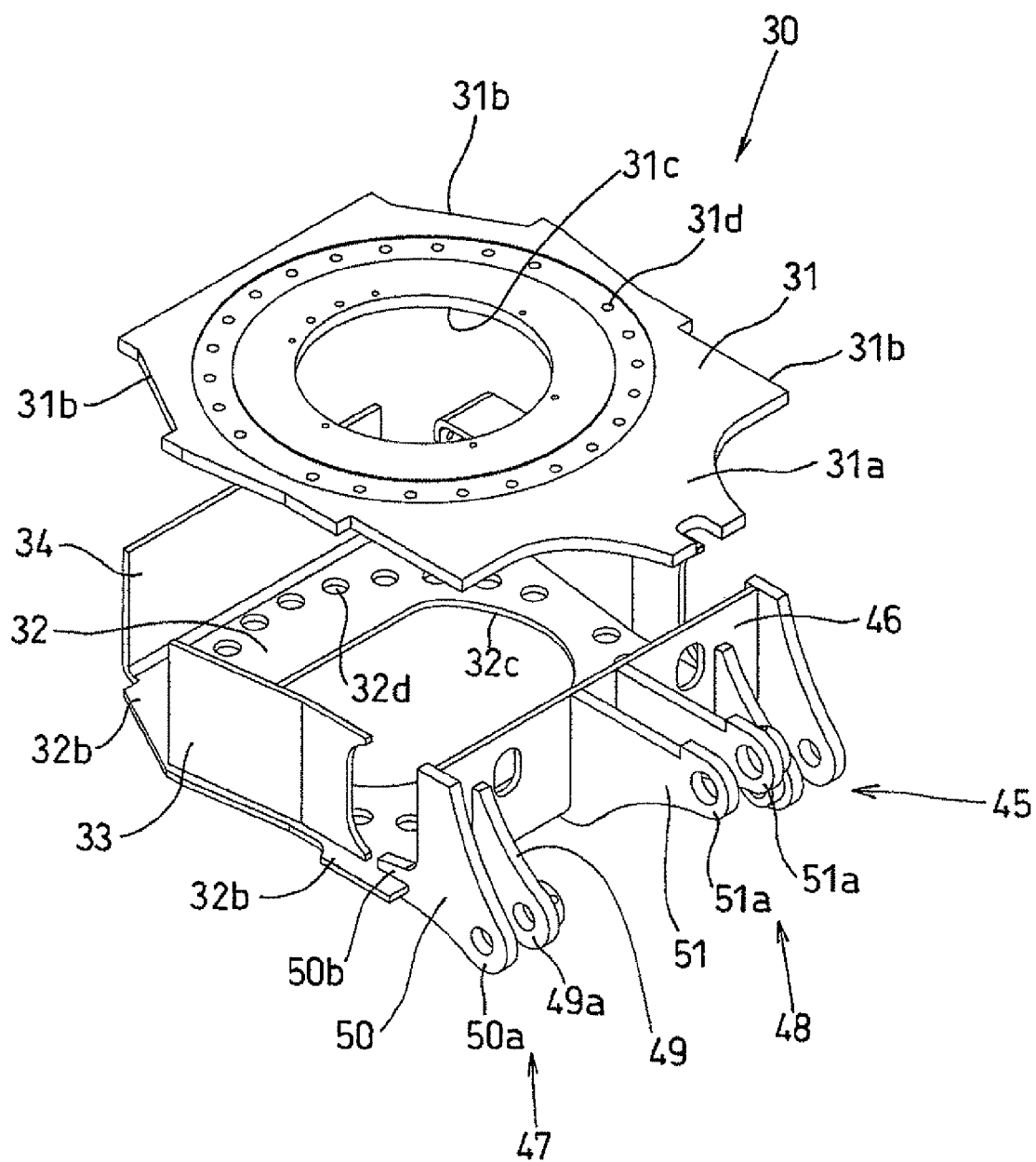
FIG. 7 is an exploded perspective view of a center frame.

As shown in FIG. 1, FIG. 3 and FIG. 7, the center frame 30 includes an upper plate member 31, a lower plate member 32, and a pair of right and left lateral walls 33 and a rear wall 34 which are disposed erect between the opposed inner faces of the upper and lower plate members 31, 32.

Incidentally, these components, i.e. the upper and lower plate members 31, 32, the lateral walls 33 and the rear wall 34 are formed of iron plates, steel plates or the like and as shown in FIG. 3, the plate thickness (t) of the upper plate member 31 is greater than the plate thickness (u) of the lower plate member 33.

The center frame 30 constitutes a three-dimensional structure formed by joining the upper and lower plate members 31, 32 through the lateral walls 33 and the rear wall 34, and these lateral walls 33 and the rear wall 34 function also as ribs for the upper and lower plate members 31, 32.

Also, as shown in FIG. 1, the center frame 30 rotatably supports swiveling body 3 via the swivel bearing 12 provided at the upper center portion A thereof.

At the center portion A, the upper plate member 31 defines a circular opening 31c extending through the plate member vertically and a number of bolt holes 31d for attaching the swivel bearing 12 are formed equidistantly with each other in the perimeter of this opening 31d, so that this portion constitutes a bearing receiving portion. Further, at the front end of the upper plate member 31, there is formed an extension portion 31a extending away from the center portion. This extension portion 31a extends forwardly toward the center portion with a curve in a concave arcuate shape.

Figure 2:
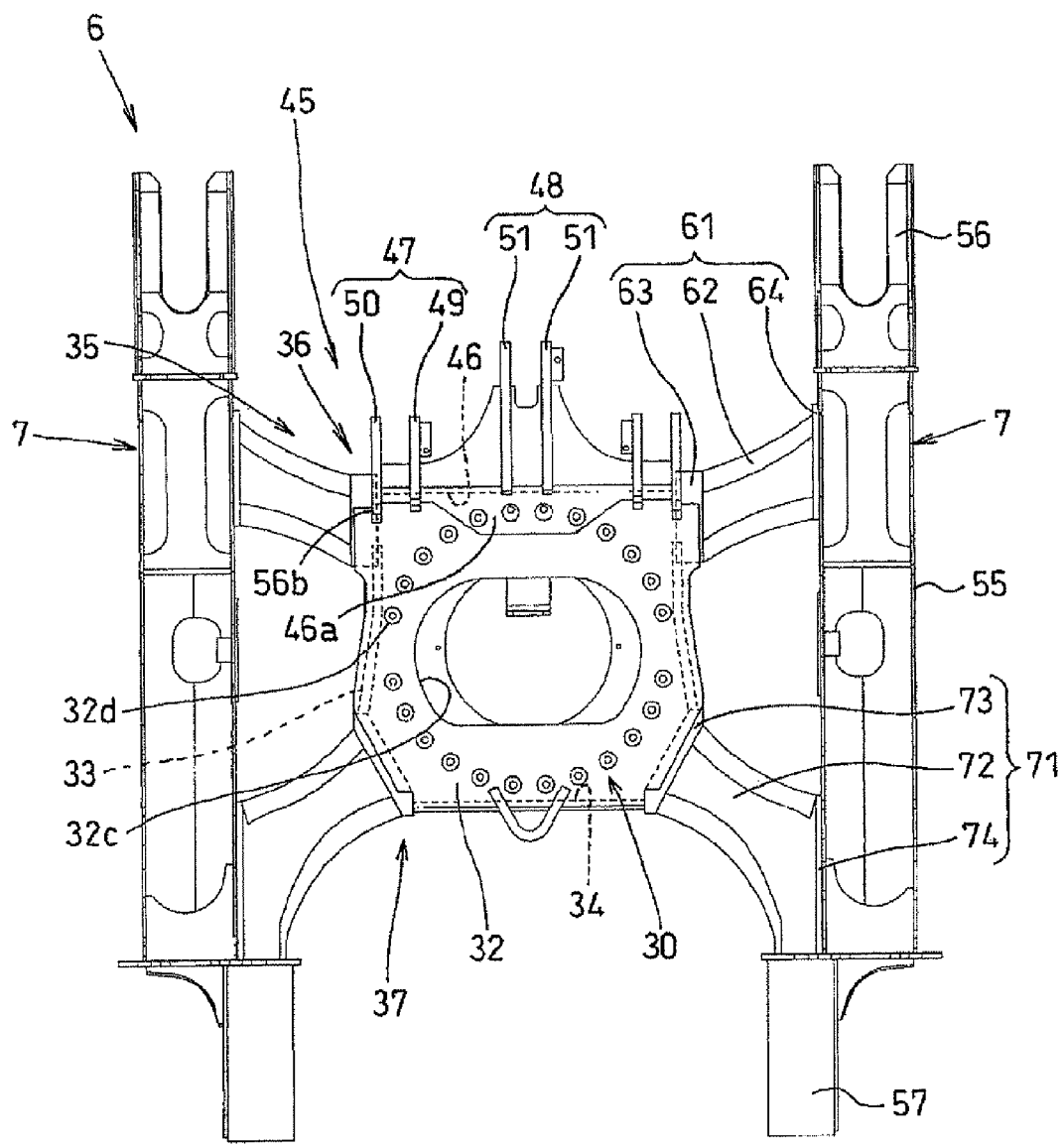
FIG. 2 is a bottom side view of the track frame.

Further, as shown in FIG. 2, at the center portion A, the lower plate member 32 defines an opening 32c used for e.g. inspection of the inside of the center frame 30. And, in the perimeter of this opening 32e, there are defined equidistantly a number of insertion holes 32d corresponding to the bolt holes 32c. As a tool such as a box wrench is inserted into the center frame 30 through the respective insertion holes 32d, so that bolts can be fastened from inside the center frame 30 for securing the swivel bearing 12.

Referring now to the dozer device 5, a blade 41 is fixedly attached to leading ends of a pair of right and left dozer arms 40, and a leading end of a dozer cylinder 43 is connected to a connecting bracket secured to a horizontal member 42 bridged between the pair of right and left dozer arms 40, rearwardly of the blade 41; and in response to an action of this dozer cylinder 43, the dozer arms 40 are pivoted to lift up/down the blade 41. Further, between each dozer arm 40 and the blade 41, there is provided a skew plate 40a.

This dozer device 5 is disposed forwardly of the center frame 30 via a dozer bracket 45.

This dozer bracket 45 is provided between the upper plate member 31 and the lower plate member 32 of the center frame 30 and includes a plate-like support wall 46 extending in the right/left direction in the front portion between these upper and lower plate members 31, 32. As shown in FIG. 2, at the lower end of this support wall 46, there is provided, as a projection, a lower-plate connecting portion 46a formed by bending and this lower-plate connecting portion 46a is joined to the front portion of the lower plate member 32 and the upper end portion of the support plate 46 is joined to the extension portion 31a of the upper plate member 31, whereby the front portions of the upper and lower plate members 31, 32 are interconnected through this support wall 46. As a result, the support wall 46 acts also as a front wall of the center frame 30.

Further, as shown in FIG. 3 and FIG. 7, the support wall 46 includes, at the extreme ends thereof, dozer supports 47 for supporting the pair of right and left dozer arms 40 and includes also, between the pair of dozer supports 47, cylinder supports 47 for supporting dozer cylinders 43.

Each dozer support 47 includes an inner bracket portion 49 provided as a projection in the support wall 46 and a plate-like outer bracket portion 50 opposed to the inner bracket portion 49 and extending through the lateral edge of the support wall 46 and extending from the front side to the rear side of the support wall 46. This outer bracket portion 50 is disposed in the center frame 30, with the rear end portion thereof being placed in opposition to the front end of the lateral wall 33 of the center frame 30, so that this outer bracket portion 50 acts also as a lateral wall of the center frame 30.

Further, the outer bracket portion 50 includes, at a front portion thereof, an arm pivot 50a which is formed convexly arcuate and pivotally supports the dozer arm 40 and includes, at a rear portion thereof, a pair of upper and lower clamping portions 50b for clamping therebetween the lower plate member 32 along the fore/aft direction.

Further, the inner bracket portion 49 includes, at a front portion thereof, an arm pivot 49a provided at a position in opposition and having an identical shape to the arm pivot 50a of the outer bracket portion 50.

The cylinder support 48 is formed of a pair of right and left plate-like bracket members 51 and each bracket member 51 forms, at a front end thereof, a cylinder pivot 51a for pivotally supporting the dozer cylinder 43. This cylinder pivot 51a projects more forwardly than the extension portion 31a of the upper plate member 31 and projects upwardly by an amount corresponding to the plate thickness of the upper plate member 31. Hence, as shown in FIG. 3, the upper edge of the cylinder pivot 51a and the top face of the extension portion 31a are formed flush with each other.

As shown in FIG. 1 and FIG. 7, on the opposed lateral sides of the center frame 30, there are formed connecting leg joining portions 35 for joining the pairs of front/rear, right/left connecting legs 61, 71. Each connecting leg joining portion 35 includes a front joining portion 36 provided forwardly of the swivel axis X and a rear joining portion 37 provided rearwardly of the swivel axis X, and the pair of these front and rear joining portions are provided at a position in right/left symmetry via a centerline Y extending in the fore/aft direction through the swivel axis X.

Each front joining portion 36 includes a cutout portion 31b formed at a front side portion of the upper plate member 31, a seat portion 32b formed, as a projection, at a front side portion of the lower plate member 32 in opposition to the cutout portion 31b, the front end of the lateral wall 33 and the outer bracket portion 50 of the dozer bracket 45.

Each rear joining portion 37 includes the cutout portion 31b formed at the front side portion of the upper plate member 31, the seat portion 32b formed, as a projection, at the front side portion of the lower plate member 32 in opposition to the cutout portion 31b, the rear end of the lateral wall 33 and the lateral end of the rear wall 34.

As shown in FIGS. 1-3, each side frame 7 comprises a support frame 55 having a substantially portal-shaped front side sectional shape and extending in the fore/aft direction, and a driven wheel support 56 for supporting the driven wheel 9b and a drive wheel support 57 for supporting the drive wheel 9a, respectively secured to the support frame 55.

Further, as shown in FIG. 3, the pair of right and left side frames 7 are disposed laterally downwardly of the center frame 30, whereby the top face of the support frame 55 of each side frame is positioned downwardly of the upper plate member 31 of the center frame 30.

As shown in FIG. 1, the front connecting leg 61 of each one of the pair of front and rear connecting legs 8 is jointed to the front joining portion 36 of the center frame 30 and extending toward the front portion of the side frame 7 and the rear connecting leg 71 of the same is jointed to the rear joining portion 37 of the center frame 30 and extending toward the rear portion of the side frame 7. As each connecting leg 61, 71 is jointed to the front/rear joining portion 36, 37 of the center frame 30, the pairs of front/rear, right/left connecting legs 61, 71 are arranged in symmetry relative to the above-described centerline.

Figure 5:
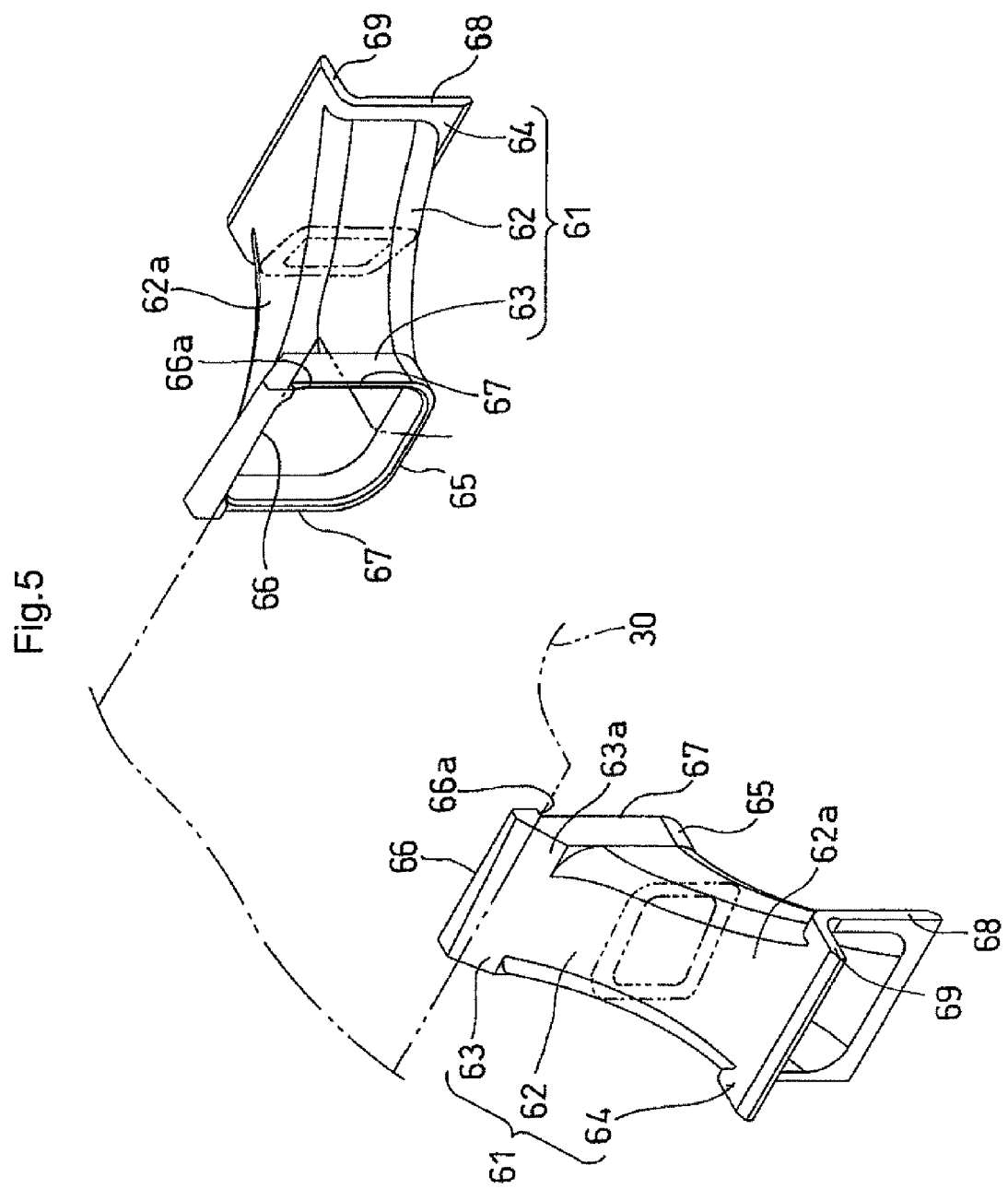
FIG. 5 is a perspective view of front connecting legs.

The front connecting leg 61 is made by casing using cast steel and, as shown in FIG. 5, includes a tubular body portion 62 having a substantially square cross sectional shape, a center joining portion 63 formed at a lateral edge of the body portion 62 on the side of the center frame 30, and a side joining portion 64 formed at a lateral edge of the body portion 62 on the side of the side frame 7.

The body portion 62 of the front connecting leg 61 has a flared shape toward its opposed opened edges formed by an arcuate curved face and has a progressively increased cross section area from a longitudinal center portion thereof toward the opposed opened edges in the direction normal to the longitudinal direction. Further, the body portion 62 has a top face 62a formed flat and front and rear edges of this top face 62a are chamfered. With this, the connecting leg 61 can have a smaller cross section at the center portion thereof, compared with a construction in which the center portion between the opposed opened edges of the body portion 62 extends straight between these opposed opened edges, without any constriction at the center portion. This provides weight reduction of the conning leg 62 as a whole.

Further, as described above, the body portion 62 of the connecting leg 61 has a smoothly concavely arcuate constricted shape from the opposed opened edges toward the center portion. As the opposed opened edges are interconnected by this smooth constricted shape, it is possible to avoid stress concentration at the intermediate portion of the body portion 62 and to allow smooth stress transmission between the center frame 30 and the side frames 7 via the connecting legs 61.

Further, the body portion 62 has a downwardly inclined shape from the center frame 30 toward the side frame 7. Also, as shown in FIG. 1 and FIG. 2, the body portion 62 extends obliquely forwardly from the center frame 30. That is to say, this body portion 62 is formed with an obliquely downward inclination from the lateral portion of the center frame 30.

On the other hand, the terminal edge (opened edge) of the body portion 62 on the side of the center frame is formed along the lateral portion of the center frame 30. With this, this terminal edge is formed with an inclination by an angle $\alpha$ relative to the axis P of the body portion 62 as shown in the plan view of FIG. 1 and also by an angle $\beta$ relative to the axis in the front view of FIG. 3. With this arrangement, the contacting face of the center joining portion 63 provided at this end relative to the center frame 30 is formed greater than the cross section D normal to the axis P of the body portion 62.

Further, the terminal edge (opened edge) of the body portion 62 on the side of the side frame is formed along the support frame 55 of the center frame 7. With this, this terminal edge is formed with an inclination by an angle $\gamma$ relative to the axis P as shown in the plan view of FIG. 1 and also by an angle $\delta$ relative to the axis P in the front view of FIG. 3. With this, the contacting face of the side joining portion provided at this terminal edge relative to the side frame 7 is formed greater than the cross section E normal to the axis P of the body portion 62.

Further, as shown in FIG. 5, the center joining portion 63 of the front connecting leg 61 is formed like a frame having a vertically elongated square cross section, enlarged in its height direction than in its width direction. Further, referring to this center joining portion 63, the lower end portion thereof is formed as an overlapping portion 65 vertically overlapped with the lower plate member 32 of the center frame 30 and the upper end portion thereof is formed as an abutment portion 66 placed in horizontal abutment against the upper plate member 31 of the center frame 30 and a portion between this abutment portion 66, and the overlapping portion 65 is formed as a contacting portion 67 opposed to the lateral side of the center frame 30 and vertically extending. Further, the abutment portion 66 projects more forwardly than the contacting portion 67. The lower end of the abutment portion 66 is formed as an engaging portion 66a covering the exposed upper end face of the outer bracket portion 50 of the dozer bracket 45 and coming into contact with the cutout portion 31b of the upper plate member 31.

The top face 63a of the center joining portion 63 is chamfered along the top face of the body portion 62, whereby the top face 62a of the body portion 62 and the top face 63a of the center joining portion 63 are joined in flush with each other.

The side joining portion 64 of the front connecting leg 61 extends along the top face of the body portion 62 so that the portion 64 is configured as a rectangular portion elongated in the fore/aft direction, thus being enlarged in the width direction than in the height direction. Also, this side joining portion 64 includes a contacting portion 68 which extends in the form of a flange, from the lateral edge of the body portion 62 on the side of the side frame 7 and comes into contact with the lateral wall 55a of the support frame 55 of the side frame 7, and a superposing piece 69 projecting from the upper end of this contacting portion 68 to be superposed on the upper wall 55b of the support frame 55 of the side frame 7, thus being vertically overlapped with this upper wall 55b.

Figure 6:
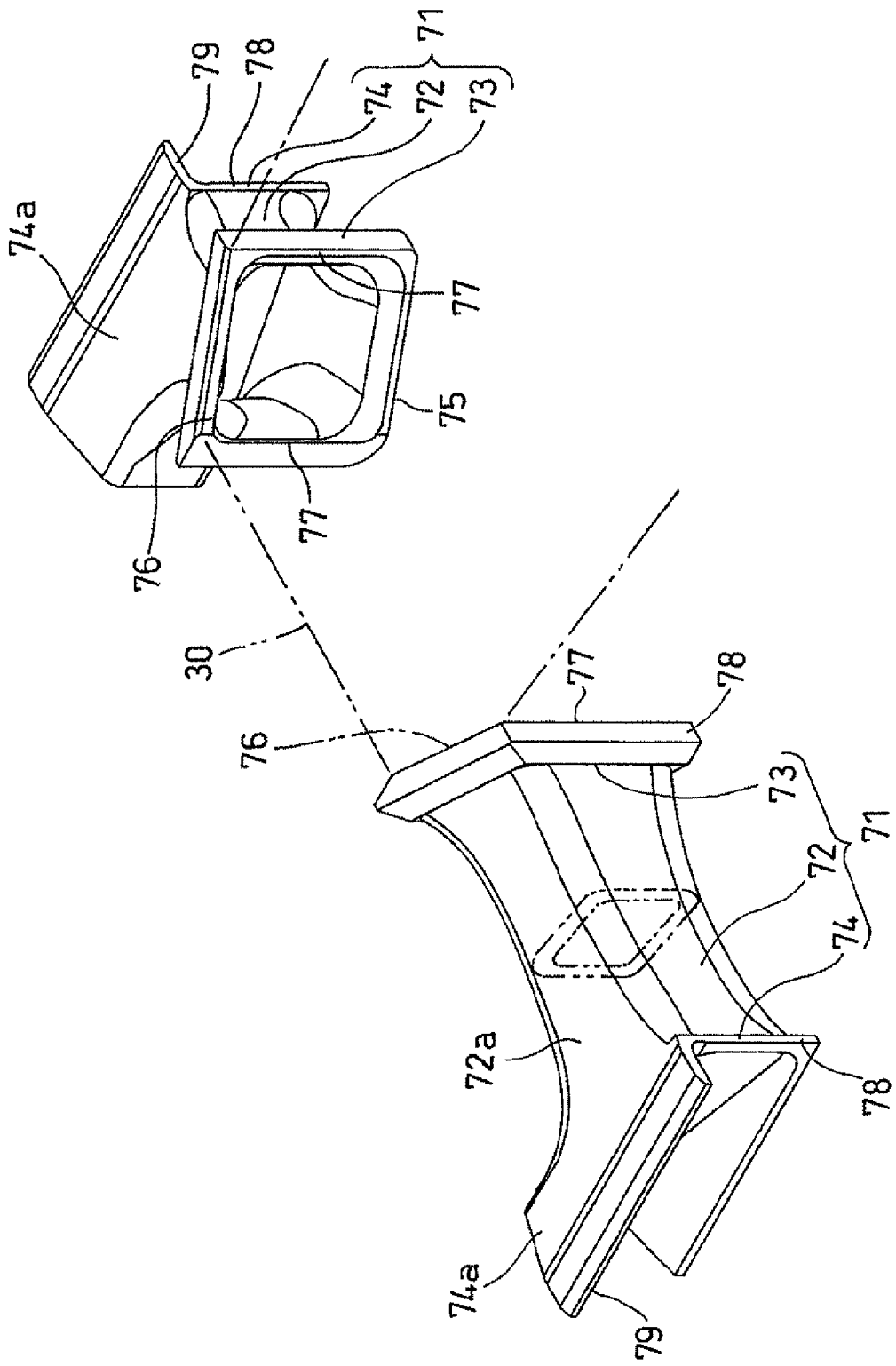
FIG. 6 is a perspective view of rear connecting legs.

The rear connecting leg 71 is formed by casting using cast steel and includes, as shown in FIG. 6, a tubular body portion 72 having a substantially square cross sectional shape, a center joining portion 73 formed at a lateral edge of the body portion 72 on the side of the center frame 30, and a side joining portion 74 formed at a lateral edge of the body portion 72 on the side of the side frame 7.

The body portion 72 of the rear connecting leg 71 has a flared shape comprised of an arcuate curved face toward the opposed opened edges thereof, with the cross sectional area thereof progressively increasing along the longitudinal direction from the longitudinal center portion toward the opposed opened edges. Further, the top face of this body portion 72 is formed flat, with front and rear edges of this top face being chamfered. With this, the connecting leg 71 can have a smaller cross section at its center portion, compared with a leg wherein the center portion of the body portion 72 between the opposed opened edges extends straight to interconnect the opposed opened edges, without any construction, so that the weight of the connecting leg 72 as a whole is reduced.

Further, as described above, the body portion 72 of the connecting leg 71 is formed in a constricted shape in the form of a smooth concave arcuate shape toward the center portion from the opposed opened edges. As the opposed opened edges are smoothly interconnected via this constricted shape, it is possible to avoid stress concentration at the intermediate portion of the body portion 72, thus realizing smooth stress transmission via the connecting leg 71 between the center frame 30 and the side frame 7.

Figure 4:
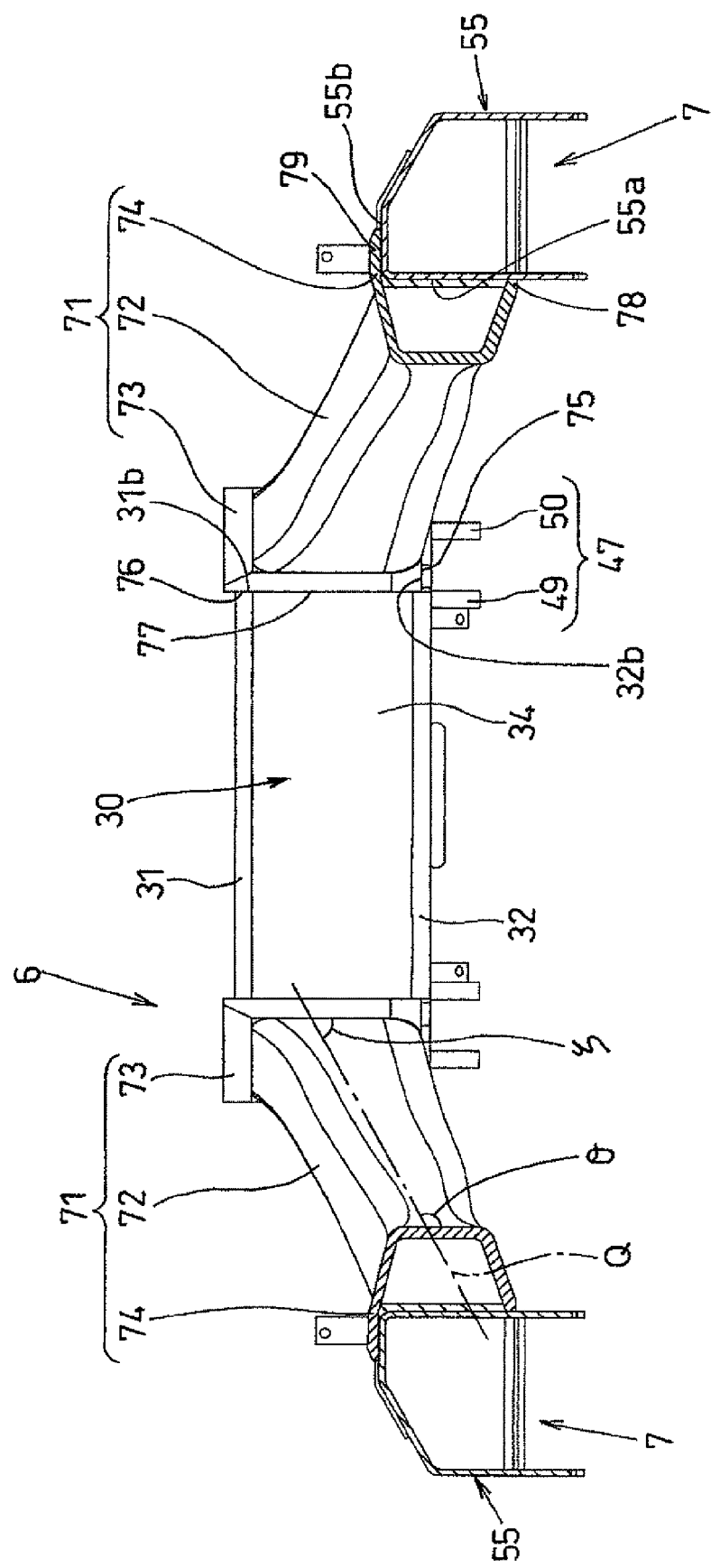
FIG. 4 is a rear side view in cross section of the track frame.

Further, as shown in FIG. 4 and FIG. 6, the body portion 72 of the rear connecting leg 71 is also formed in a downwardly inclined shape from the center frame 30 toward the side frame 7. Also, as shown in FIG. 1 and FIG. 2, the body portion 72 extends obliquely rearwards from the center frame 30, whereby this body portion 72 is formed with obliquely downward inclination from the lateral side of the center frame 30.

On the other hand, the terminal edge (opened edge) of the body portion 72 on the side of the center frame is formed at a position where the corner portion is chamfered from the lateral portion to the rear portion of the center frame 30. With this, in a rear view as shown in FIG. 4, this terminal edge is formed with an inclination by an angle $\zeta$ relative to an axis Q of the body portion 72.

Further, the terminal edge (opened edge) of the body portion 72 on the side of the side frame is formed along the support frame 55 of the side frame 7. With this, as shown in FIG. 1, this terminal edge is formed with an angle $\eta$ relative to the axis Q and with an angle $\theta$ relative to the axis Q in the rear view as shown in FIG. 4. With these, the joining face of the side joining portion 74 relative to the side frame 7, which joining face is provided at this terminal edge, is formed greater than a cross section F normal to the axis Q of the body portion 72.

The center joining portion 73 of the rear connecting leg 71 is formed like a frame having a vertically elongated rectangular cross section, with increased size in the height direction than that in the width direction. Further, in this center joining portion 73, its lower end is formed as an overlapping portion 75 to be vertically overlapped with the lower plate member 32 of the center frame 30, its upper end is formed as an abutment portion 76 to be placed in horizontal abutment against the upper plate member 31 of the center frame 30, and its portion between this abutment portion 76 and the overlapping portion 75 is formed as an contacting portion 77 opposed to the lateral side of the center frame 30 and extending vertically between the abutment portion 76 and the overlapping portion 75.

The side joining portion 74 of the rear connecting leg 71 extends along the support frame 55 of the side frame 7, thus being formed in a fore/aft elongated rectangular shape, with a greater size in the width direction than that in the height direction. Also, this side joining portion 74 has a contacting portion 78 which extends in the form of flange from the terminal end of the body portion 72 on the side of the side frame 7 and contacting the lateral wall 55a of the support frame 55 of the side frame 7 to be placed in abutment in the right/left direction against this lateral wall 55a. And, this contacting portion 78 includes, as a projection from its upper end, a superposing piece 79 superposed on the upper wall 55b of the support frame 55 of the side frame 7 to be vertically overlapped with this upper wall 55b.

Further, the top face 74a of this side joining portion 74 is formed substantially flush with the top face 72a of the body portion 72, whereby the top face of the body portion 72 is connected flush with the top face 72a of the side joining portion 74. Referring to these front and rear connecting legs 61, 71 in details, as described before, the center joining portion 63, 73 is formed in a vertically elongated square shape and the side joining portion 64, 74 is formed in a fore/aft elongated square shape. Hence, in the body portion 62, 72 interconnecting these, its terminal edge on the side of the center joining portion is formed in a vertically elongated square shape and the terminal edge thereof on the side of the side joining portion is formed in a horizontally elongated shape, thus realizing smooth transition from the vertically elongated shape to the horizontally elongated shape, from the terminal edge on the side of the center joining portion to the terminal edge on the side of the side joining portion.

This embodiment has the above-described constructions. For constructing the above-described track frame 6, first, as shown in FIG. 7, to the opposed lateral sides of the top face of the lower plate member 32, the lateral walls 33 are welded and joined under their erect postures. And, the plate blank for forming the lower plate member 32 is bent by 90 degrees to form the rear wall 34. Alternatively, this rear wall 34 can be formed erect by welding/joining a plate blank like that used for forming the lateral wall 33, to the rear end of the top face of the lower plate member 32.

Next, the lower connecting portion 46a of the support wall 46 of the dozer bracket 45 is welded and joined to the front portion of the lower plate member 32, thus attaching the support wall 46 erect to the front portion of the lower plate member 32.

And, the pair of right and left bracket members 51 of the cylinder support 48 are welded and joined to the right/left center portion of the front face of the support wall 46 and also the outer bracket portion 51 and the inner bracket portion 49 of the dozer support member 47 are welded and joined to the opposed lateral portions of the support wall 46. In this, as shown in FIG. 2, the lower ends of the right and left bracket members 51 extend to the rear face of the lower plate connecting portion 46a, so, as these lower ends are welded and joined to the lower plate connecting portion 46a, the support strength of these paired right and left bracket members 51 is improved.

Further, the inner bracket portion 49 of each dozer support 47 extends beyond the lower plate connecting portion 46a to the rear face of the lower plate member 32, so, as this lower end is welded and joined to the lower plate connecting portion 46a and the lower plate member 32, the support strength of this inner bracket portion is improved.

Further, as shown in FIG. 7, when the outer bracket portion 50 of each dozer support 47 is arranged at a predetermined position, the outer bracket portion 50, with the lateral face of the support wall 46 contacting its inner face, extends beyond this support wall 46 to the rear side to the rear side of the lower plate member 32. And, under this condition, the support wall 46 is welded and joined to the outer bracket portion 50. Also, as shown in FIG. 2 and FIG. 7, the lower plate connecting portion 46a and the lower plate member 32 are clamped between the pair of upper and lower clamping portions 50b of the outer bracket portion 50, hence, as these paired upper and lower clamping portions 50b are welded respectively to the lower plate connecting portion 46a and the lower plate member 32, the support strength of the outer bracket portion 9 is further enhanced.

Next, as shown in FIG. 7, under the condition of each cutout portion 31b of the upper plate member 31 being placed in opposition to each seat portion 32b of the lower plate member 32, the upper plate member 31 is welded and joined to the upper ends of the lateral wall 33, the lateral wall 34, the rear wall 34, the support wall 46 of the dozer bracket 45, the cylinder support 48, and of the pared right and left dozer supports 47, whereby the center frame 30 is formed.

Further, with this formation of the center frame 30, there are also formed the rear joining portion 37 constituted by the cutout portion 31b of the upper plate member 31, the seat portion 32b of the lower plate member 32, the rear end of the lateral wall 33, and the lateral end of the rear wall 33 and the front joining portion 36 constituted by the cutout portion 31b of the upper plate member 31, the seat portion 32b of the lower plate member 32, the rear portion of the outer bracket portion 50 and the front portion of the lateral wall 33.

Figure 8:
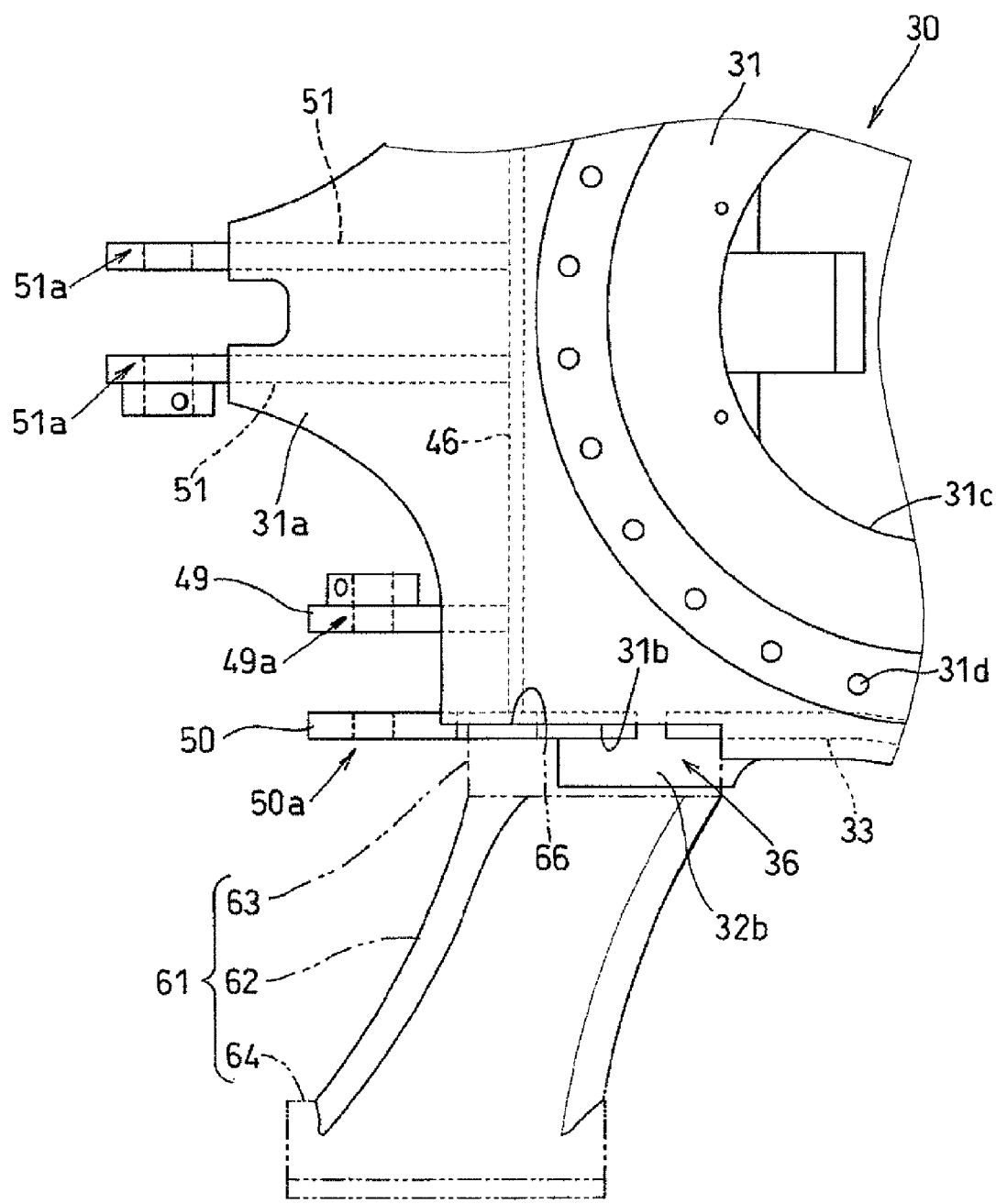
FIG. 8 is a plan view of a front joining portion.

As shown in FIG. 8, with the formation of the center frame 30, the upper end faces of the outer bracket portion 50 of the dozer bracket 45 and the front portion of the lateral wall 33 are covered with the cutout portion 31b of the upper plate member 31 whereas the right/left outer side thereof is exposed to the outside. In this, only the right/let inner side covered with the upper plate member 31 is welded and joined to the upper plate member 31. With this, in the outer bracket portion 50, the lower end thereof is supported to the lower plate member 32 and the upper end thereof is supported to the upper plate member 31 and the inner side thereof is supported to the support wall 46, thus obtaining an extremely high support strength.

Further, referring to each one of the paired right and left bracket members 51 of the cylinder support 48, as shown in FIG. 3, the upper end of the cylinder pivot 51a is formed flush with the top face of the extension portion 31a, and this upper end contacts with the extension portion 31a from the rear portion along the rear end of this cylinder support 51a. Whereby, these paired right and left bracket members 51 engage with the extension portion 31a. Then, as these portions are welded and joined to the extension portion 31a, the pair of right and left bracket members 51 have their rear ends supported to the support wall 46 and the lower plate connecting portion 46a and have their upper ends supported to the upper plate member 31, thus obtaining an extremely high support strength.

Further, as the cylinder pivot 51a projects upward by the amount corresponding to the plate thickness of the upper plate member 31, the entire cylinder support 48 is positioned upward by the plate thickness amount. With this, the support position of the dozer device 5 is positioned upward by this plate thickness and also there is ensured sufficient height for the space under the cylinder support 48. As a result, in the case of e.g. the backhoe 1 striding over a soil mass raised from the leveled ground surface, it is possible to restrict contact between the dozer device 5 and/or the cylinder support 48 to this soil mass or the like.

Further, as viewed differently, the pair of right and left outer bracket portions 50 and the pair of right and left bracket members 51 of the cylinder support 48 function also as ribs for reinforcing the upper plate member 31 and the lower plate member 32, so that these upper and lower plate members 31, 32 are reinforced through the dozer bracket 45 having these outer bracket portions 50 and the bracket members 51.

Figure 9:
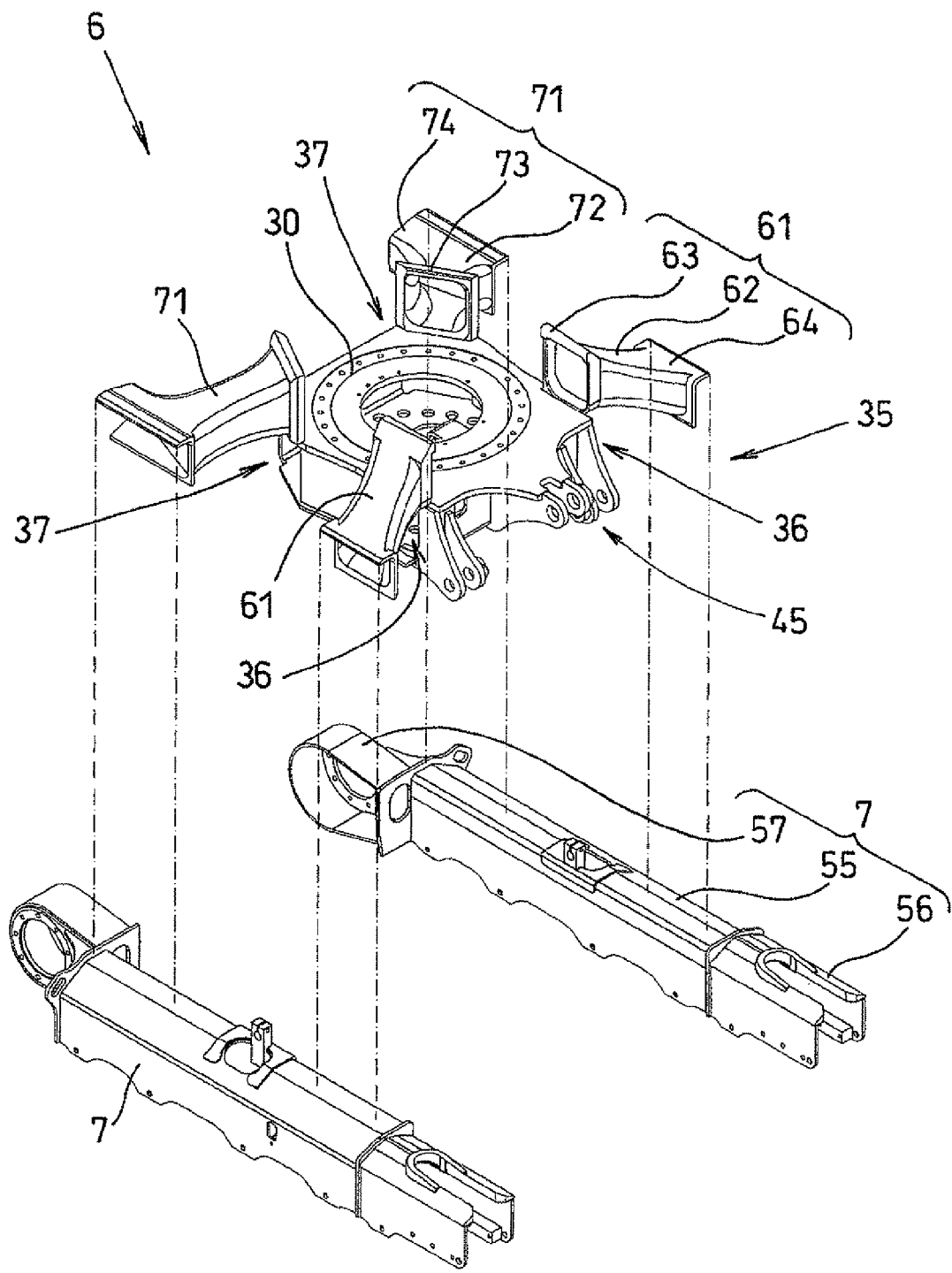
FIG. 9 is an exploded perspective view of the track frame.

Next, as shown in FIG. 9, the center joining portions 63 of the front connecting legs 61 are joined respectively to the pair of right and left front joining portions 36 of the center frame 30 and also the center joining portions 73 of the rear connecting legs 71 are joined respectively to the pair of right and left rear joining portions 37 of the same.

Figure 10:
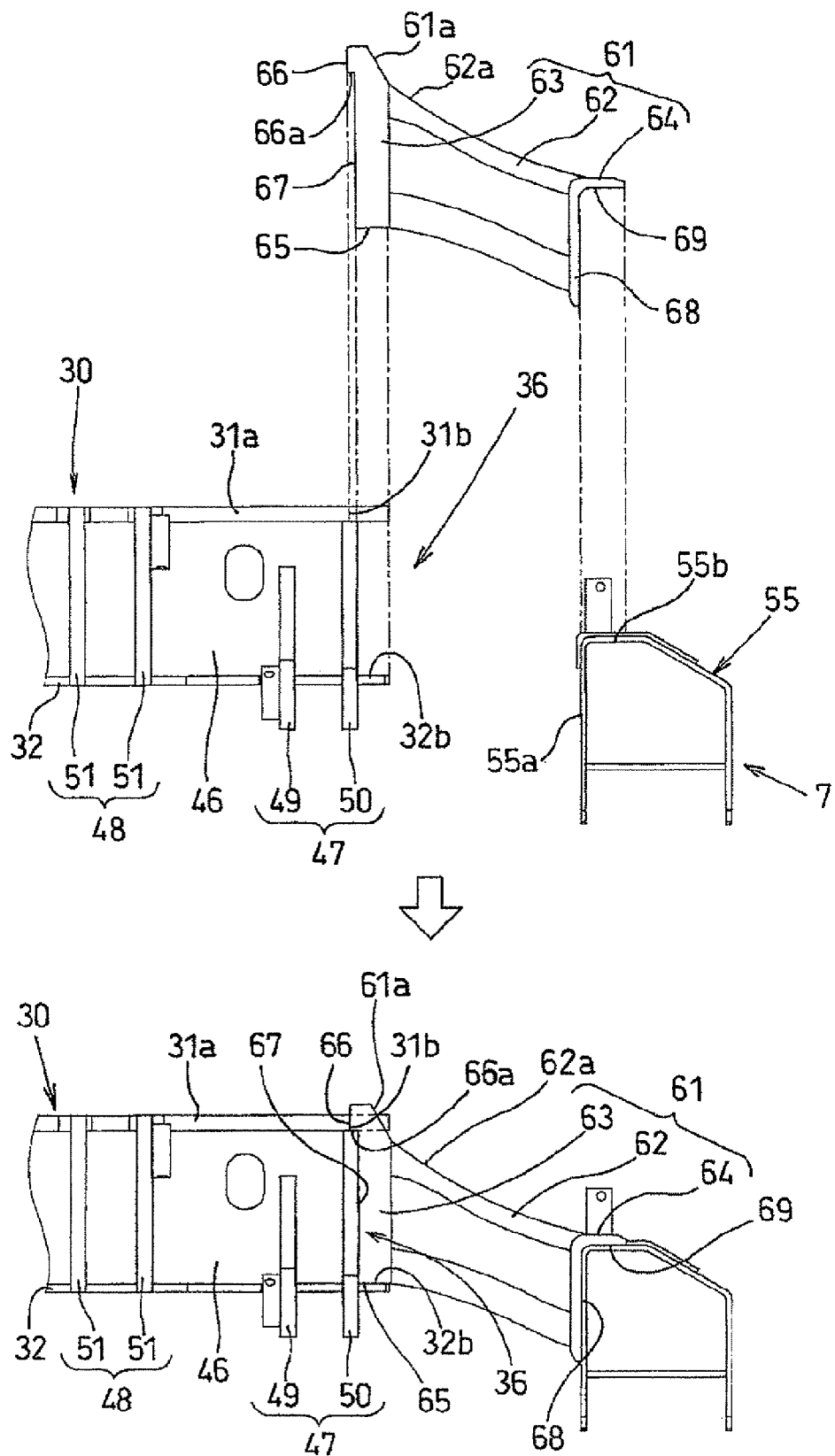
FIG. 10 is a front view showing joined condition of the track frame.

For joining the center joining portions 63 of the front connecting legs 61 to the front joining portions 36 of the center frame 30, as shown in FIG. 10, first, the front connecting leg 61 will be moved from above (or aside) the front joining portion 36 to the vicinity of this front joining portion 36 and the center joining portion 63 of the front connecting leg 61 will be positioned to this front joining portion 36. In this, as the front joining leg 61 is formed as a single integral component, the position adjustment can be done easily.

With the above, the overlapping portion 65 of the center joining portion 63 will be overlapped with the seat portion 32b of the lower plate member 32 and also the contacting face of the contacting portion 67 will come into contact with the outer face of the outer bracket portion 50 and the outer face of the lateral wall 33 and further the abutment portion 66 will come into abutment against the cutout portion 31b of the upper plate member 31. And, the engaging portion 66a of this abutment portion 66 will cover the exposed upper ends of the outer bracket portion 50 and the lateral wall 33.

Next, welding/joining operation will be effected on each contacting portion. As shown in FIG. 2, the outer peripheral portion of the overlapping portion 65 projects slightly from the seat portion 32b of the lower plate member 32 and as filet welding is provided along this outer peripheral portion, the overlapping portion 65 will be welded/joined to the seat portion 32b.

Further, as shown in FIG. 10, the contacting portion 67 will be joined by filet welding to the outer face of the outer bracket portion 50 and the outer face of the lateral wall 33. With this, the outer bracket portion 50 will be welded/joined to the support wall 46 and the center joining portion 63, with the outer bracket portion 50 being clamped between the support wall 46 and the center joining portion 63. Further, the abutment portion 66 and the cutout portion 31b will be joined to each other through butt welding or filet welding. In this way, the center joining portion 63 of the front connecting leg 61 is vertically elongated such that when its lower end is placed on the lower plate member 32, its upper end projects beyond the upper plate member 31. As a result, as an additional vertical welding length, the plate thickness of the upper plate member 31 can be added to the height of the outer bracket portion 50 (lateral wall 33). Whereby, the welding strength (rigidity) of the joining portion between the center frame 30 and the front connecting leg 61 can be enhanced.

Also, referring to the center joining portion 63 of the front connecting leg 61, the contacting portion 67 and the abutment portion 66 are joined via the vertical joining faces, to the front joining portion 36 of the center frame 30 and the overlapping portion 65 is joined via the horizontal joining face, to the front joining portion 36. Namely, the front connecting leg 61 is joined to the center frame 30 through the two joining faces extending normal to each other. With this, even when any load of tensile, compression, shearing loads, is applied to the joining portion between the center frame 30 and the front connecting leg 61 due to a work load, this load can be effectively transmitted and distributed via this joining portion.

Further, the front connecting leg 61 is joined not only to the lateral wall 33, but also directly to the upper and lower plate members 31, 32 and the outer bracket portion 50 of the dozer bracket 45. Therefore, the load applied to the front connecting leg 61 can be effectively transmitted and distributed to these upper and lower plate members 31, 32 and the outer bracket portion 50, thus relieving local stress concentration at the front joining portion 36. Especially, as the upper plate member 31 has a greater plate thickness than the lower plate member 32, the direct joining to this upper plate member 31 provides high stress transmission/distribution effect.

Also, the load applied to these upper and lower plate members 31, 32 and the outer bracket portion 50 too can be transmitted to the front connecting legs 61. Therefore, the work load of the dozer device 5 transmitted through the dozer bracket 45 and/or the work load of the excavating device 4 transmitted through the swivel bearing 12 can be effectively transmitted/distributed from the front connecting legs 61 to the side frame 7.

Figure 11:
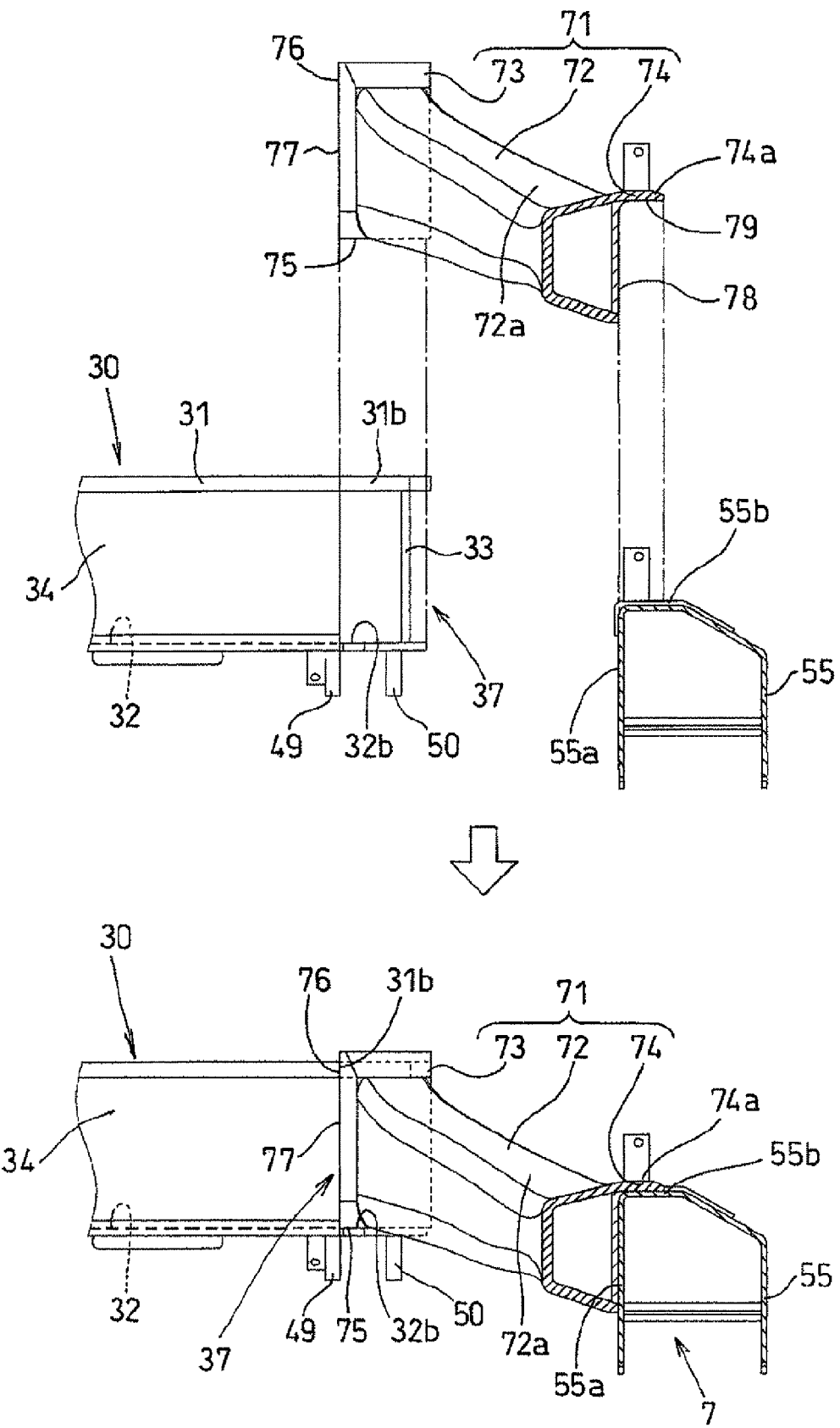
FIG. 11 is a rear side view showing the joined condition of the track frame.

Further, similarly, for joining the center joining portion 73 of the rear connecting leg 71 to the rear joining portion 37 of the center frame 30, as shown in FIG. 11, first, the rear connecting leg 71 will be moved from above (or aside) the rear joining portion 37 to the vicinity of this rear joining portion 37 and the center joining portion 73 of the rear connecting leg 71 will be positioned to this rear joining portion 37. With the above, the overlapping portion 75 of the center joining portion 73 will be overlapped with the seat portion 32b of the lower plate member 32 and also the contacting portion 71 will come into contact with the rear end of the lateral wall 33 and the lateral end of the rear wall 34 and further the abutment portion 76 will come into abutment against the cutout portion 31b of the upper plate member 31.

Next, to each contacting portion, welding/joining operation will be effected. In this, as the outer peripheral portion of the overlapping portion 75 slightly projects beyond the seat 32b of the lower plate member 32 as shown in FIG. 2, then, by effecting filet welding operation along this outer peripheral portion, the overlapping portion 65 will be welded/joined to the seat portion 32b.

Also, as shown in FIG. 11, the contacting portion 77 will be joined to the rear end of the lateral wall 33 and the lateral end of the lateral wall 34 by butt welding or filet welding. Also, the abutment portion 76 and the cutout portion 31b will be joined to each other by butt welding or filet welding. In this way, as the center joining portion 73 of the rear connecting leg 71 is vertically elongated such that when its lower end is placed on the lower plate member 32, its upper end projects beyond the upper plate member 31. As a result, as an additional vertical welding length, the plate thickness of the upper plate member 31 can be added to the height of the lateral wall 33 (rear wall 34), whereby sufficient welding length can be ensured, so that the strength of the joining portion between the center frame 30 and the rear connecting leg 71 can be enhanced.

Also, referring to the center joining portion 73 of the rear connecting leg 71, the contacting portion 77 and the abutment portion 76 are joined via the vertical joining faces, to the rear joining portion 37 of the center frame 30 and the overlapping portion 75 is joined via the horizontal joining face, to the rear joining portion 37. Namely, the rear connecting leg 71 is joined to the center frame 30 through the two joining faces extending normal to each other. With this, even when any load of tensile, compression, shearing loads, is applied to the joining portion between the center frame 30 and the rear connecting leg 71 due to a work load, this load can be effectively transmitted and distributed via this joining portion.

Further, the rear connecting leg 71 is joined not only to the lateral wall 33 and the rear wall 34, but also directly to the upper and lower plate members 31, 32. Therefore, the load applied to the rear connecting leg 71 can be effectively transmitted and distributed to these upper and lower plate members 31, 32, thus relieving local stress concentration at the joining portion between the rear connecting leg 71 and the center frame 30.

Also, the load applied to these upper and lower plate members 31, 22 too can be transmitted to the rear connecting leg 71.

Next, the side frames 7 will be joined to the front and rear connecting legs 61, 71, respectively.

For joining the side joining portion 64 of the front connecting leg 61 to the side frame 7, as shown in FIG. 10, the contacting portion 68 of this side joining portion 64 will be placed in contact with the lateral wall 55a of the side frame 7 and also the superposing piece 69 will be placed in contact with the upper wall 55b of this support frame 55. And, by effecting filet welding along the outer peripheries of these contacting portion 68 and the superposing piece 69, the side joining portion 64 will be joined to the support frame 55. Whereby, the front connecting leg 61 will be joined to the side frame 7.

In the above, as the side joining portion 64 of the front connecting leg 61 is formed elongated in the fore/aft direction along the side frame 7. There is ensured sufficient welding length, thereby to enhance the strength at the joining portion between the side frame 7 and the front connecting leg 61.

Further, for joining the side joining portion 74 of the rear connecting leg 71 to the side frame 7, as shown in FIG. 11, the contacting portion 78 of the side joining portion 74 will be placed into contact with the lateral wall 55a of the support frame 55 of the side frame 7 and also the superposing piece 79 will be placed into contact with the upper wall 55a of this support frame 55. Further, as shown in FIG. 9 and FIG. 12, the rear end of the contacting portion 78 and the rear end of the superposing piece 79 will be placed into contact with the drive wheel support 57. And, by effecting filet welding along the outer peripheries of the contacting portion 78 and the superposing piece 79, the side joining portion 74 will be joined to the support frame 55 and the drive wheel support 57. Whereby, the rear connecting leg 71 will be joined to the side frame 7.

Referring to the side joining portions 64, 74 of the front and rear connecting legs 61, 71, the connecting portion 68, 78 are joined to the lateral wall 55a of the support frame 55 through the vertical joining faces and the superposing pieces 69, 79 projecting from these contacting portions 68, 78 are joined via the horizontal joining face to the upper wall 55b of the support frame 55. That is to say, the front and rear connecting legs 61, 71 are joined to the side frame 7 through the two joining faces extending normal to each other. With this, even when any load of tensile, compression, shearing loads, is applied to the joining portion between the side frame 7 and the front and rear connecting legs 61, 71 due to a work load, this load can be effectively transmitted and distributed via this joining portion.

Also, in the side joining portion 74 of the rear connecting leg 74, the rear ends of the contacting portion 78 and the superposing piece 79 are joined to the drive wheel support 57 through the joining face extending in the right/left direction, thereby to further enhance the support strength.

Through the above-described process, as shown in FIG. 12, the pair of right and left side frames 7 will be jointed to the center frame 30 via the front and rear, right and left paired connecting legs 61, 71, thus forming the track frame 6.

According to the present embodiment, the body portions 62, 72 of the connecting legs 61, 71 are formed with constriction at the center portions between the opposed opened edges thereof. Hence, compared with the construction extending straight between the opposed opened edges without such constricted center portion, the cross section at the center portion can be smaller, thus realizing weight reduction. On the other hand, it is believed that such reduction in the cross section of the center portion can lead to reduction in the strength in the connecting legs 61, 71. However, as sufficient welding length between the center frame 30 and the front and rear, right and left paired connecting legs 61, 71 and sufficient welding length between the side frames 7 and the respective connecting legs 61, 71 are ensured, the support strengths of the connecting legs 61, 71 as a whole are maintained or even improved. With this, there is achieved improvement in the strength at the joining portions of the center frame 30, the side frames 7 and the respective connecting legs 61, 71, and stress concentration at these joining portions and their peripheries are relieved.

Further, as the body portion 62, 72 of each connecting leg 61, 71 is formed in flared shaped toward its opposed opened edges, stress concentration at the constricted center portion can be avoided and stress can be smoothly transmitted. Whereas, although there is the possibility of stress concentration at the opposed opened edges with the flared shape, these portions are respectively joined firmly to the center frame 30 and the side frame 7 through the center joining portion 63, 73 and the side joining portion 64, 74, respectively. With this, the stress concentration at the body portion 62, 72 too can be avoided as much as possible.

Moreover, the body portion 62, 72 of the connecting leg 61, 71 interconnects the opposed opened edges smoothly through the constricted center portion as described above, stress concentration at this intermediate portion is avoided and smooth stress transmission is made possible between the center frame 30 and the side frame 7 via the connecting legs.

Also, as the welding operations are effected with placing the center joining portion 63, 73 of each connecting leg 61, 71 in face contact with the respective joining face 36, 37 of the center frame 30 and placing the side joining portion 64, 74 in face contact with the support 55 of the side frame, there are achieved improvements in welding quality and welding strength. With this, the rigidity of the track frame 6 as a whole is enhanced.

Moreover, the outer bracket portion 61 of the dozer bracket 45 constitutes the front joining portion 36 and this outer bracket portion 51, as being supported to the support wall 46, is joined to the upper and lower plate members 31, 32 and also to the front connecting leg 61, the load from the dozer device 5 can be effectively transmitted and distributed to the front connecting leg 61 and/or to the center frame 30. Further, the load transmitted to these front connecting leg 61 and the center frame 30 too can be transmitted and distributed to the outer bracket portion 51, thus further enhancing the rigidity of the track frame 6 as a whole.

Further, as described above, at the last step for completing the track frame 6, the center frame 30 and the side frames 7 are joined to each other via the respective connecting legs 61, 71 and the respective connecting legs 61, 71 can be attached individually to the center frame 30 or the side frame 7, so the positioning of each connecting leg 61, 71 relative to the center frame 30 or the side frame 7 can be effected easily. As a result, the production efficiency can be improved.

Also, in the intermediate process of assembling the track frame 6, there is no necessity of cutting e.g. the center frame 30 by machining, so there is no possibility of damaging the center frame 30 or the like with generation of cut material or in association with cutting.

The embodiment of the present invention has been described above. It is understood, however, that the present invention is not limited to the above-described embodiment. For instance, the effect similar to that achieved by the instant embodiment can be achieved also when e.g. the height of the center joining portion 63 of each connecting leg 61, 71 is set flush with the top face of the upper plate member 31, with the height being positioned to each joining portion 36, 37.

Further, the effect similar to that achieved by the instant embodiment can be achieved also when the upper end of the center joining portion 63, 73 of each connecting leg 61, 71 is formed as an overlapping portion, its lower portion is formed as an abutment portion, the seat portion is formed in the upper plate member 31 constituting the joining portion of the center frame 30 and the cutout portion is formed in the lower plate member 32.

Moreover, the cross sectional shape of the body portion 62, 72 of each connecting leg 61, 71 need not be limited to the square tubular shape described above, such shapes as a polygonal tubular shape, an oval tubular shape, a cylindrical shape, etc. can be adopted.

INDUSTRIAL APPLICABILITY

The present invention can be applied as a track frame for a work machine.

The invention claimed is:
1. A track frame comprising a center frame mounting a swiveling body so that the swiveling body can swivel about a swivel axis, a pair of right and left side frames arranged laterally of the center frame, and a pair of front and rear, right and left connecting legs jointed to said center frame and said side frames for connecting these together;
 wherein each said connecting leg includes a tubular body portion having a pair of opened edges, a center joining portion provided at one of the opened edges of the body portion to be joined to the center frame and a side joining portion provided at the other opened edge of the body portion to be joined to the side frame; and wherein in the center joining portion of the connecting leg, one of its upper and lower ends is formed as an overlapping portion to be overlapped vertically with the center frame, the other is formed as an abutment portion in horizontal abutment to the center frame, and said overlapping portion and said abutment portion are joined to the center frame by welding, and a portion between the overlapping portion and the abutment portion is formed as a contacting portion opposed to the lateral side of the center frame and vertically extending.

2. The track frame according to claim 1, wherein said body portion is formed of an arcuate curved face and has a cross section normal to a longitudinal direction thereof increasing from a longitudinal center thereof toward said pair of opened edges; and wherein said center joining portion has a vertical dimension greater than a vertical dimension of the center frame.

3. The track frame according to claim 1, wherein said center frame includes an upper plate member, a lower plate member and a dozer bracket supporting a dozer device, and said connecting legs are joined to said upper and lower plate members and said dozer bracket.

4. The track frame according to claim 3, wherein said dozer bracket includes a plate-like support wall joined to said upper plate member and said lower plate member and extending in the right/left direction; said support wall includes, at lateral edges thereof, a pair of right and left dozer supports for supporting a pair of right and left dozer arms constituting said dozer device, each said dozer support having an inner bracket portion projecting from the support wall and a plate-like outer bracket portion opposed to said inner bracket portion and extending through the lateral end of the support wall from the front side to the rear side of the support wall; and said outer bracket portion has its upper end lower ends jointed respectively to said upper and lower plate members and has its inner face joined to said support wall and also has its outer face joined to said connecting leg.

5. The track frame according to claim 4, wherein said upper plate member defines a cutout portion which slightly exposes the upper end face of the outer bracket portion to the outside as seen in a plan view; and said connecting leg includes an engaging portion which covers the exposed upper end face of the outer bracket portion and comes into contact with said cutout portion of the upper plate member.

6. The track frame according to claim 4, wherein said connecting leg is joined to said center frame and said outer bracket portion, with a lower end of the connecting leg being vertically overlapped with the center frame.

7. The track frame according to claim 4, wherein a right/left center portion of said upper plate member extends further forwardly of the support wall of the dozer bracket; said dozer bracket includes, between a pair of right and left dozer supports, a cylinder support for supporting a dozer cylinder constituting said dozer device; an upper end of said cylinder support includes a cylinder pivot which projects further forwardly than said upper plate member by an amount corresponding to a plate thickness of this upper plate member, and is joined to said upper plate member from a rear end thereof joined to said support wall to a rear portion of said cylinder support.

8. The track frame according to claim 1, wherein said abutment portion projects more forwardly than said contacting portion.

9. The track frame according to claim 1, wherein said center joining portion is flush with a top face of an upper plate member of said center frame.

10. A track frame comprising a center frame mounting a swiveling body so that the swiveling body can swivel about a swivel axis, a pair of right and left side frames arranged laterally of the center frame, and a pair of front and rear, right and left connecting legs jointed to said center frame and said side frames for connecting these together;

wherein each said connecting leg includes a tubular body portion having a pair of opened edges, a center joining portion provided at one of the opened edges of the body portion to be joined to the center frame and a side joining portion provided at the other opened edge of the body portion to be joined to the side frame, said center joining portion being flush with or projecting upwardly from a top face of said center frame;

wherein said center frame includes an upper plate member, a lower plate member and a dozer bracket supporting a dozer device, and said connecting legs are joined to said upper and lower plate members and said dozer bracket; and wherein said dozer bracket includes a plate-like support wall joined to said upper plate member and said lower plate member and extending in the right/left direction; said support wall includes, at lateral edges thereof, a pair of right and left dozer supports for supporting a pair of right and left dozer arms constituting said dozer device, each said dozer support having an inner bracket portion projecting from the support wall and a plate-like outer bracket portion opposed to said inner bracket portion and extending through the lateral end of the support wall from the front side to the rear side of the support wall; and said outer bracket portion has its upper end lower ends jointed respectively to said upper and lower plate members and has its inner face joined to said support wall and also has its outer face joined to said connecting leg.

11. The track frame according to claim 10, wherein said upper plate member defines a cutout portion which slightly exposes the upper end face of the outer bracket portion to the outside as seen in a plan view; and said connecting leg includes an engaging portion which covers the exposed upper end face of the outer bracket portion and comes into contact with said cutout portion of the upper plate member.

12. The track frame according to claim 10, wherein said connecting leg is joined to said center frame and said outer bracket portion, with a lower end of the connecting leg being vertically overlapped with the center frame.

13. The track frame according to claim 10, wherein a right/left center portion of said upper plate member extends further forwardly of the support wall of the dozer bracket; said dozer bracket includes, between a pair of right and left dozer supports, a cylinder support for supporting a dozer cylinder constituting said dozer device; an upper end of said cylinder support includes a cylinder pivot which projects further forwardly than said upper plate member by an amount corresponding to a plate thickness of this upper plate member, and is joined to said upper plate member from a rear end thereof joined to said support wall to a rear portion of said cylinder support.

\* \* \* \* \*